United States Patent
Brand et al.

(10) Patent No.: US 9,579,600 B2
(45) Date of Patent: Feb. 28, 2017

(54) METHOD OF AND APPARATUS FOR COMBUSTING SULFUROUS FUEL IN A CIRCULATING FLUIDIZED BED BOILER

(71) Applicant: Foster Wheeler Energia Oy, Espoo (FI)

(72) Inventors: Tobias Brand, Grossostheim (DE); Reijo Kuivalainen, Varkaus (FI); Maria-Helena Möbs, Bad Nauheim (DE); Rolf Graf, Friedrichsdorf (DE)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 0 days.

(21) Appl. No.: 14/374,931

(22) PCT Filed: Nov. 22, 2013

(86) PCT No.: PCT/EP2013/074438
§ 371 (c)(1),
(2) Date: Jul. 28, 2014

(87) PCT Pub. No.: WO2015/074705
PCT Pub. Date: May 28, 2015

(65) Prior Publication Data
US 2016/0201903 A1    Jul. 14, 2016

(51) Int. Cl.
*B01D 53/73* (2006.01)
*F23J 1/00* (2006.01)
(Continued)

(52) U.S. Cl.
CPC .............. *B01D 53/73* (2013.01); *B01D 53/12* (2013.01); *B01D 53/508* (2013.01); *F23C 10/00* (2013.01);
(Continued)

(58) Field of Classification Search
CPC .............. F23C 10/10; F23C 10/26; F23J 7/00; F23J 11/00; F23J 15/00; F23J 15/003; F23J 2215/20; F23J 2219/60; F23J 2900/01001; F23J 2900/01003
See application file for complete search history.

(56) References Cited

U.S. PATENT DOCUMENTS

| | | | |
|---|---|---|---|
| 4,185,080 A | 1/1980 | Rechmeier | |
| 4,309,393 A | 1/1982 | Nguyen | |

(Continued)

FOREIGN PATENT DOCUMENTS

| | | |
|---|---|---|
| DE | 4104180 C1 | 6/1992 |
| WO | 89/07974 A1 | 9/1989 |

OTHER PUBLICATIONS

Notification of and International Search Report mailed May 9, 2014, in counterpart International Application No. PCT/EP2013/074438.
(Continued)

*Primary Examiner* — David J Laux
(74) *Attorney, Agent, or Firm* — Fitzpatrick, Cella, Harper & Scinto

(57) ABSTRACT

Sulfurous fuel and $CaCO_3$-containing sorbent are combusted in a furnace of a circulating fluidized bed boiler. A dry circulating fluidized bed scrubber includes a reactor with water and $Ca(OH)_2$ feeds for converting $SO_2$ in the exhaust gas to $CaSO_3$ and $CaSO_4$ and a dust separator in gas flow connection with the reactor. A discharge removes CaO-containing bottom ash from the furnace. A classifier classifies a portion of the removed CaO-containing bottom ash into coarse and finer portions. A fine ash channel conveys some of the finer bottom ash portion from the classifier to a grinder. A ground ash channel conveys some of the ground bottom ash portion from the grinder to a hydrator to hydrate CaO in the ash to $Ca(OH)_2$. A hydrated ash channel conveys (Continued)

some of the Ca(OH)$_2$ from the hydrator to the dry circulating fluidized bed scrubber as a sorbent.

18 Claims, 4 Drawing Sheets

(51) Int. Cl.
    *F23C 10/00*         (2006.01)
    *B01D 53/12*         (2006.01)
    *B01D 53/50*         (2006.01)
    *F23J 15/00*         (2006.01)
    *F23J 7/00*          (2006.01)

(52) U.S. Cl.
    CPC ............... *F23C 10/002* (2013.01); *F23J 1/00* (2013.01); *F23J 7/00* (2013.01); *F23J 15/003* (2013.01); *B01D 2251/404* (2013.01); *B01D 2251/604* (2013.01); *B01D 2251/606* (2013.01); *B01D 2257/302* (2013.01); *B01D 2258/0283* (2013.01); *F23J 2215/20* (2013.01); *F23J 2215/60* (2013.01); *F23J 2900/01001* (2013.01); *F23J 2900/01003* (2013.01)

(56) References Cited

U.S. PATENT DOCUMENTS

| | | |
|---|---|---|
| 4,312,280 A | 1/1982 | Shearer et al. |
| 5,345,883 A | 9/1994 | Panos |
| 5,551,357 A | 9/1996 | Wu et al. |
| 6,290,921 B1 | 9/2001 | Kuivalainen et al. |
| 6,912,962 B2 | 7/2005 | Morin et al. |
| 7,427,384 B2 | 9/2008 | Kinnunen |
| 7,862,789 B2 | 1/2011 | Gatton, Jr. et al. |
| 2005/0287058 A1* | 12/2005 | Kinnunen ............. F23C 10/002 423/244.05 |
| 2009/0074629 A1* | 3/2009 | Maryamchik ........... F23C 10/10 422/139 |
| 2013/0125799 A1* | 5/2013 | Fried ....................... F23G 5/033 110/342 |

OTHER PUBLICATIONS

Written Opinion mailed May 9, 2014, in counterpart International Application No. PCT/EP2013/074438.
International Preliminary Report on Patentability, including Written Opinion of the International Searching Authority, issued May 24, 2016, in corresponding International Application No. PCT/EP2013/074438.

\* cited by examiner

METHOD OF AND APPARATUS FOR COMBUSTING SULFUROUS FUEL IN A CIRCULATING FLUIDIZED BED BOILER

CLAIM OF PRIORITY

This application is a U.S. national stage application of PCT International Application No. PCT/EP2012/074438, filed Nov. 22, 2013.

BACKGROUND OF THE INVENTION

Field of the Invention

The present invention relates to a method of and an apparatus for combusting sulfurous fuel in a circulating fluidized bed boiler. The invention especially relates to reducing sulfur dioxide ($SO_2$) content in the exhaust gas emanating from a circulating fluidized bed (CFB) boiler by using a dry circulating fluidized bed (CFB) scrubber.

Description of the Related Art

When combusting sulfur-containing fuels, the sulfur in the fuel is converted to sulfur oxides, mainly, sulfur dioxide, which may be harmful if emitted to the environment in large quantities. Dry flue gas scrubbing in a circulating fluidized bed scrubber is a commonly used method to reduce $SO_2$ content in the flue gases emanating from different kinds of plants, such as power boilers, cement kilns, glass furnaces, and waste incinerators. When using a circulating fluidized bed (CFB) boiler, $SO_2$ content of the exhaust gas is commonly reduced by feeding limestone into the furnace of the boiler. At the temperatures prevailing in the furnace of a CFB boiler, usually from 750° C. to 950° C., calcium carbonate ($CaCO_3$) of the limestone is calcined to form calcium oxide (CaO), which reacts with sulfur oxides to produce calcium sulfate ($CaSO_4$), which can be removed from the furnace along with the ashes produced in the combustion.

Relatively good sulfur-reduction efficiency can be obtained in a CFB boiler solely by feeding limestone directly into the furnace. However, because a layer of $CaSO_4$ forming on the surface of the CaO particles prevents the core of the particles from reacting with $SO_2$, an excess of limestone has to be fed into the furnace in order to obtain a desired level of $SO_2$ removal. For example, in order to achieve 98% sulfur reduction efficiency in the furnace, a Ca/S molar ratio as high as four to five is required.

Ash formed in a combustion process can be divided to fly ash, which is entrained with the exhaust gas from the furnace and bottom ash that collects to the bottom of the furnace. During the combustion, bottom ash is formed at a rate which, as well as the composition of the bottom ash, depends on the operating conditions of the boiler, especially, on the properties of the fuel, sorbent, and inert bed material fed into the furnace. Typically, from 10% to 50% of the ashes formed in a circulating fluidized bed boiler are removed from the furnace as bottom ash. Bottom ash is generally coarser than the fly ash.

When using high Ca/S ratios, such as from four to five, the bottom ash and fly ash discharged from the furnace invariably contain a large amount of CaO, typically, from about 10% to more than 50%, which makes the use or disposal of the ashes difficult.

Another problem associated with the conventional sulfur-reduction process in a CFB furnace is that the calcination of calcium carbonate is an endothermic reaction, with a reaction energy of 178.4 kJ/kmol. Thus, the calcination of excessive amounts of limestone decreases the thermal efficiency of the boiler. For example, in order to achieve 98% sulfur reduction when combusting coal containing 2% sulfur, limestone is introduced at a rate providing a Ca/S ratio of about five, and the energy required for calcination reduces the thermal efficiency of the boiler by about 2 percentage points.

In order to eliminate the need for such high Ca/S ratios, U.S. Pat. No. 4,185,080 teaches to remove ashes, calcium oxide, and calcium sulfate from a fluidized bed and to separate fine grade ashes, e.g., by sifting, and calcium sulfate, e.g., in a drum, from the calcium oxide. The calcium oxide is then dry slaked to an extremely fine-grained calcium hydroxide that is blasted into the fluidized bed or into a free board above the bed to react with sulfur oxides in the combustion gases. U.S. Pat. No. 5,345,883 teaches to re-activate recirculating sorbent material of a circulating fluidized bed boiler by injecting high pressure water as a liquid or steam to mechanically fracture used sorbent particles so as to expose unreacted sorbent material in the core of the particles. U.S. Pat. No. 5,551,357 and U.S. Pat. No. 6,912,962 show further methods of enhancing flue gas desulfurization by, e.g., hydrating a portion of CaO in the bottom ash before injecting it back to the furnace.

An alternative for enhancing sulfur reduction in a fluidized bed boiler is to perform only a portion of the required sulfur dioxide reduction in the furnace, and to arrange a second sulfur dioxide reduction device downstream of the furnace. U.S. Pat. No. 7,427,384 suggests feeding calcium carbonate to the furnace of a circulating fluidized bed boiler so as to provide a Ca/S molar ratio of at most about 1.0 and further reducing the sulfur content of the flue gas in a sulfur reducing stage, such as dry sulfur-reduction equipment, downstream of the furnace. Correspondingly, U.S. Pat. No. 7,862,789 suggests conveying flue gases from a circulating fluidized bed boiler to a flash dry absorber and introducing lime into the flash dry absorber.

U.S. Pat. No. 4,309,393 discloses a sulfur-reduction method for a fluidized bed boiler, in which limestone is added to the furnace in a Ca/S ratio ranging from 1 to 1.5, so as to provide sulfur reduction of 30% to 60% in the furnace. CaO-containing ashes are then collected from the furnace and slaked to form lime slurry for utilization in an $SO_2$ stripping unit, such as a spray dryer, disposed in the flue gas duct downstream of the furnace. U.S. Pat. No. 6,290,921 teaches to feed sieved CaO-containing bottom ash of a circulating fluidized bed boiler to a moistening device between a dust separator and a contact reactor of a sulfur reduction system.

An object of the present invention is to provide a method of and an apparatus for combusting sulfurous fuel in a circulating fluidized bed boiler with improved desulfurization.

SUMMARY OF THE INVENTION

According to one aspect, the present invention provides a method of combusting sulfurous fuel in a circulating fluidized bed boiler, comprising the steps of feeding sulfurous fuel to a furnace of the boiler, combusting the fuel and generating $SO_2$-containing exhaust gas, feeding $CaCO_3$-containing sorbent to the furnace for converting the $CaCO_3$ to CaO and utilizing a portion of the CaO in the furnace to convert a portion of the $SO_2$ to $CaSO_4$, conveying the exhaust gas along an exhaust gas channel from the furnace to a dry circulating fluidized bed scrubber comprising a reactor having feeds for feeding water and $Ca(OH)_2$ for converting $SO_2$ in the exhaust gas to $CaSO_3$ and $CaSO_4$ and a dust separator in gas flow connection with the reactor for separating particulate matter from the exhaust gas, removing CaO-containing bottom ash from the furnace, classifying at least a portion of the removed CaO-containing bottom ash into a coarse bottom ash portion and a finer bottom ash portion in a first stage classifier, wherein the coarse bottom ash portion consists of particles having a particle size larger than a first predetermined limit, removing the coarse bottom ash portion from the boiler as a first combustion product, conveying at least a portion of the finer bottom ash portion to a grinder so as to grind the finer bottom ash portion to have a median particle size smaller than a second predetermined limit, conveying the ground finer bottom ash portion from the grinder to a hydrator so as to hydrate CaO in the ground finer bottom ash portion with a controlled amount of water or steam to $Ca(OH)_2$, and conveying at least a portion of the $Ca(OH)_2$ from the hydrator to the dry circulating fluidized bed scrubber as a sorbent.

According to another aspect, the present invention provides an apparatus for combusting sulfurous fuel in a circulating fluidized bed boiler, comprising a furnace and a feed for feeding sulfurous fuel to the furnace for combusting the fuel and generating $SO_2$-containing exhaust gas, a feed for feeding $CaCO_3$-containing sorbent to the furnace for converting the $CaCO_3$ to CaO and utilizing a portion of the CaO in the furnace to convert a portion of the $SO_2$ to $CaSO_4$, an exhaust gas channel for conveying the exhaust gas from the furnace to a dry circulating fluidized bed scrubber comprising a reactor having feeds for feeding water and $Ca(OH)_2$ for converting $SO_2$ in the exhaust gas to $CaSO_3$ and $CaSO_4$ and a dust separator in gas flow connection with the reactor for separating particulate matter from the exhaust gas, a discharge for removing CaO-containing bottom ash from the furnace, a first stage classifier for classifying at least a portion of the removed CaO-containing bottom ash into a coarse bottom ash portion and a finer bottom ash portion, wherein the coarse bottom ash portion consists of particles having a particle size larger than a first predetermined limit, a discharge channel for removing the coarse bottom ash portion from the first stage classifier to a hopper, a fine ash channel for conveying at least a portion of the finer bottom ash portion from the first stage classifier to a grinder so as to grind the finer bottom ash portion to have a median particle size smaller than a second predetermined limit, a ground ash channel for conveying the ground finer bottom ash portion from the grinder to a hydrator so as to hydrate CaO in the ground finer bottom ash portion with a controlled amount of water or steam to $Ca(OH)_2$, and a hydrated ash channel for conveying at least a portion of the $Ca(OH)_2$ from the hydrator to the dry circulating fluidized bed scrubber as a sorbent.

Dry circulating fluidized bed (CFB) scrubbers are known, for example, from European Patent No. 0 211 458 B2. Usually, dry CFB scrubbers use fresh hydrated lime as the sorbent, but in some cases, especially, when desulfurizing flue gas from a CFB boiler, it is possible to form at least a portion of the sorbent from CaO-containing ash particles entrained with the flue gas. German Patent No. 41 04 180 C1 teaches how fly ash, separated from the flue gas, can be prepared to be used as a sorbent.

Typically, the particle size distribution of the bottom ash of a CFB boiler is such that more than 90% of the bottom ash particles have a diameter between 0.1 mm and 20 mm, with a median of, for example, 0.35 mm. The present invention is especially based on the finding that, in addition to the particle size, bottom ash distinguishes from fly ash also in its composition. Thereby, bottom ash may, after being treated properly, be utilized as an efficient sorbent in a dry circulating fluidized bed scrubber.

The step of classifying, i.e., selective classification or separation of the CaO-containing bottom ash effectively divides the bottom ash into a first portion, a so-called coarse bottom ash portion and a second portion, a so-called finer bottom ash portion. The finer bottom ash portion has, in addition to a smaller particle size, also, a lower density, a higher lime content, and a lower potential for abrasion and erosion. The coarse bottom ash portion has, correspondingly, in addition to a larger particle size, also, a higher density, a lower lime content, and a higher potential for abrasion and erosion. According to a preferred embodiment of the present invention, both the finer bottom ash portion and the coarse bottom ash portion contain 10% to 90%, even more preferably, 20% to 80%, of the bottom ash. Advantageously, the coarse bottom ash portion consists of particles having a particle size larger than a first predetermined limit. By the term "particle size" is here meant a particle size based on a sieve analysis. The first predetermined limit depends on the combustion conditions. In typical conditions, the first predetermined limit is preferably at most 2 mm, even more preferably, at most 1 mm. In practice, it is not necessary to continuously determine the particle size distribution, but the particle size distribution is usually known, for example, on the basis of sampling, and the classification can be controlled by controlling the separation parameters so as to control the ratios of the different mass flows.

According to an advantageous embodiment of the present invention, between the first stage classifier and the grinder is arranged a second stage classifier to separate a portion of the finer bottom ash, the finest bottom ash portion, to be removed as a second combustion product from the boiler. The finest bottom ash portion, which has a median particle size smaller than a third predetermined limit, has a relatively high concentration of $CaSO_4$. When using a second stage classifier, the finer bottom ash portion is divided into the finest bottom ash portion and a middle size bottom ash portion. Thereby, only the middle size bottom ash portion is conveyed to the grinder, and the finest bottom ash portion is, similarly as the coarse bottom ash portion, discharged from the system.

The classifying of the bottom ash in the first stage and the second stage classifiers is performed by any suitable equipment, such as a centrifugal separator, an air classifier, or a sieve. During the first stage classifying, i.e., during the classifying in the first stage classifier, the largest particles, which have a high potential for causing abrasion and erosion of any downstream equipment, are separated from the finer bottom ash portion. A special advantage of the first stage classifying is that by removing the largest particles, the relative amount of silicates, e.g., sand or $SiO_2$, and $Fe_2O_3$ in the finer bottom ash portion is reduced. A special advantage of the second stage classifying is that by removing the smallest particles, the relative amount of the product, e.g., $CaSO_4$ in the finer bottom ash is reduced. The classifying is thus especially advantageous, because it decreases the relative amount of material that is inert for $SO_2$ removal.

On the other hand, during the classifying of the bottom ash, the lime content of the coarse and finest bottom ash portions is decreased. Thereby, the usability of the coarse and finest bottom ash portions for, for example, stabilized landfill, is improved. For this reason, the coarse and finest bottom ash portions are to be considered as the first and second combustion products, respectively, of the CFB boiler.

According to the present invention, the finer or middle size bottom ash portion is conducted from the classifying step to a step of grinding. Because the classifying step eliminates or at least reduces the amount of largest and most erosive material in the bottom ash, the grinding equipment can be of a simple and a low cost design. The grinding device can be, for example, a hammer mill. According to the present invention, it is important to perform the step of grinding only after the step of classifying, because, by reversing the order, the above-mentioned advantages of the classifying would be lost.

The grinding of the finer or middle size bottom ash portion is advantageously performed to a particle size distribution that depends on the CaO content of the respective bottom ash portion. Thereby, the second predetermined limit depends on the CaO content of the respective bottom ash portion. It has been found that the higher is the CaO content, the less there is a need for grinding the bottom ash. Thus, for example, when the CaO content is 10%, the grinding is preferably performed so far that 50% of the particles have a particle size smaller than about 5 to 10 μm. In other words, the second predetermined limit is 5 to 10 μm, or the particle size distribution of the ground bottom ash has a median of 5 to 10 μm. On the other hand, when the CaO content of the bottom ash portion is higher, for example, 40%, 90%, and 95%, not so much grinding is needed, but it is enough to obtain a median particle size of 15 to 20 μm, 30 to 40 μm and 60 to 70 μm, respectively.

A simple fit to optimal grinding results shows that for CaO contents ranging from 10% to 90%, the particles are preferably ground so as to have a median particle size of 0.43*M±3 μm, where M is the CaO content in percent. The reason for the above-mentioned optimal grinding is that particles with a high CaO content are efficiently broken during the subsequent step, i.e., hydrating of the particles, and, therefore, there is less need for the mechanical grinding. If the CaO content of the particles is small, the particles are advantageously ground to a particle size distribution having a relatively low median value in order to obtain an efficient sorbent for the dry CFB scrubber. If the CaO content is higher, grinding energy can be saved by grinding less.

When considering the larger particles of the particle size distribution, instead of the median, bottom ash having a CaO content of 10% is advantageously ground so far that 90% of the particles have a particle size below 20 to 30 μm. Correspondingly, for CaO contents of 40%, 90%, and 95%, the bottom ash portion is advantageously ground to a particle size distribution having 90% of the particles below the limits of 70 to 80 μm, 300 to 400 μm, and 1000 to 2000 μm, respectively.

At least a portion of the finer or middle size bottom ash portion is conveyed from the grinding step further to a step of hydration with water and/or steam. Hydration is preferably performed by such a small amount of water that the hydrated product is essentially dry. The hydrated portion of the bottom ash is conveyed from the hydrator either directly into a CFB dry scrubber or into a silo from where it is injected into the scrubber when needed.

The equipment used in the hydration may advantageously be a CFB hydrator, but it may alternatively be a hydrator of any other suitable type. By controlling the hydrating parameters, i.e., water content, temperature, and reaction time, the quality of the activated bottom ash may be varied from standard quality reagent to high quality reagent, the latter consisting, e.g., of hydrated lime with an increased moisture content and/or an increased surface area.

The above-described process of desulfurizing exhaust gas may, in some applications, optionally be complemented by further material flows. For example, fresh lime and/or a portion of material collected by a dust separator arranged downstream of the CFB scrubber may be conveyed to the hydrator to produce further activated sorbent to the CFB scrubber. Another possibility is to convey finer or middle size bottom ash from the grinding step back to the furnace to be used as sulfur sorbent therein. In some embodiments, it is advantageous to convey a portion of the material collected by the dust separator arranged downstream of the CFB scrubber to the furnace of the CFB boiler, mainly, for oxidizing $CaSO_3$ to $CaSO_4$.

The brief description given above, as well as further objects, features, and advantages of the present invention will be more fully appreciated by reference to the following detailed description of the currently preferred, but nonetheless illustrative, embodiments in accordance with the present invention, when taken in conjunction with the accompanying drawings.

DETAILED DESCRIPTION OF THE INVENTION

Figure 1:
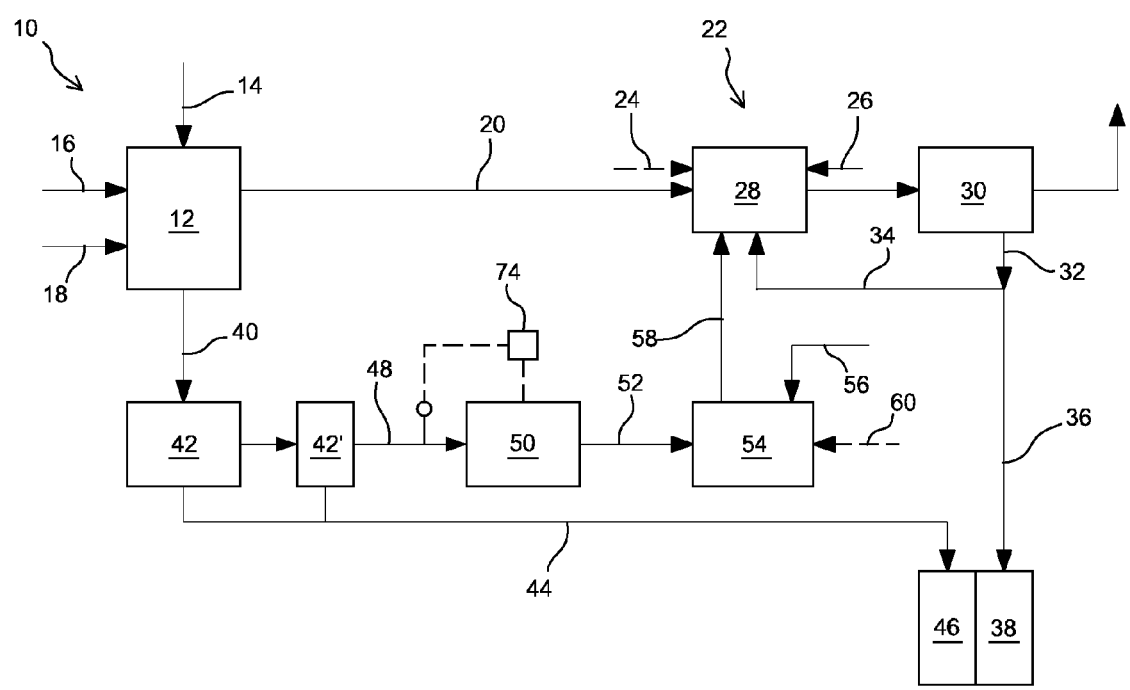
FIG. 1 shows a schematic diagram of a circulating fluidized bed boiler with an apparatus for reducing sulfur oxide emissions according to an embodiment of the present invention.

The schematic diagram of FIG. 1 shows a circulating fluidized bed (CFB) boiler (10) with a dry circulating fluidized bed (CFB) scrubber (22) for reducing sulfur oxide emissions from the boiler. The furnace (12) of the boiler comprises feeds for introducing sulfur-containing fuel (14), such as coal, petcoke or biofuel, CaCO3-containing sulfur sorbent (16), such as limestone, and inert bed material (18), such as sand, into the furnace. The fuel is combusted in the furnace with combustion gas, such as air (not shown in FIG. 1) to generate steam (not shown in FIG. 1). During the combustion, the sulfur in the fuel oxidizes to sulfur oxides, mainly $SO_2$. In the temperatures prevailing in the furnace of a CFB boiler, typically, from 750° C. to 950° C., the $CaCO_3$ in the sorbent is calcined to CaO, which combines with $SO_2$ to $CaSO_3$, which again oxidizes to $CaSO_4$. Because the sulfation of the CaO particles takes place mainly on the outer surface of the particles, the utilization of the CaO is not perfect. Thus, the combustion process generally produces $SO_2$-containing flue gases and ash that contains CaO particles covered by a layer of $CaSO_4$.

In accordance with the teaching of, for example, U.S. Pat. No. 7,427,384, the sulfur reduction process taking place in the furnace (12) is complemented by further sulfur reduction in a dry circulating fluidized bed (CFB) scrubber (22)

arranged in the exhaust gas channel (20) of the boiler. Main elements of the CFB scrubber are a reactor (28), a dust separator (30), and a recirculation channel (34) to circulate a portion of ashes separated by the dust separator back to the reactor. The reactor (28) comprises injectors (24, 26) for injecting $Ca(OH)_2$ and water, respectively, to a fluidized bed forming in the reactor (28) so as to cause the $SO_2$-containing flue gas to react with the $Ca(OH)_2$ to form $CaSO_3$ and $CaSO_4$. The exhaust gas and particles entrained therewith are conveyed from the reactor to the dust separator (30), such as a fabric filter, to separate particulate matter (32) from the exhaust gas. Cleaned exhaust gas is conveyed from the dust separator further to be released to the environment. A portion of the particulate matter separated in the dust separator (30) is recycled back to the reactor (28) along a recirculation channel (34), and another portion of the particulate matter is conveyed along a discharge channel (36) to a hopper (38), as an end product of the scrubber.

According to the present invention, CaO-containing bottom ash (40) is conveyed from the furnace (12) to a first stage classifier (42) so as to separate a portion of the bottom ash (44), a so-called coarse bottom ash portion, having a particle size larger than a predefined limit, to be removed from the CFB boiler to another hopper (46), as a first combustion product. The first stage classifier (42) is advantageously a sieve, but it can be of any other suitable type, such as a low efficiency cyclone or a centrifugal separator. When selecting the type of the classifier, it can be taken into account that a sieve classifies particles almost entirely on the basis of their size, whereas for classifying with a cyclone, the result depends also on the density, or mass, of the particles. Thus, a low efficiency cyclone is especially useful for separating particles having a relatively high density, such as silicates, from the bottom ash. By properly selecting the classifying limit, the calcium oxide content of the coarse bottom ash portion can be clearly less than that of the remaining finer bottom ash portion. Due to the relatively low calcium oxide content, the first combustion product can be used for, for example, landfill, without further treatment.

FIG. 1 also shows an optional second stage classifier (42'), such as a cyclone, arranged between the first stage classifier (42) and a grinder (50). In the second stage classifier, the finer bottom ash portion is further classified into a finest bottom ash portion and a middle size bottom ash portion. The finest bottom ash portion, which is rich in $CaSO_4$, is discharged from the boiler together with the first combustion product or separately as a second combustion product. Typically, both the coarse fraction and the finer fraction are 10% to 60% of the total amount of bottom ash. When the system comprises a second stage classifier (42'), typically, the middle size fraction is 10% to 60% and the finest fraction 10% to 40% of the total amount of bottom ash.

The finer or middle size bottom ash portion is conveyed from the first or second stage classifier (42, 42') along a fine ash channel (48) to a grinder (50). The grinder is advantageously a hammer mill, but alternatively, it can be of any other suitable type. Because of the classifying of the ash particles upstream of the grinder, the material to be fed into the grinder is not highly erosive, and the grinder can be of a simple and a low-cost design.

The calcium particles are broken during the grinding, and fresh CaO is exposed from behind a layer of CaSO4. The finer or middle size portion of the CaO-containing bottom ash is ground in the grinder so as to have a predefined particle size distribution. It has been found that the higher is the CaO content of the bottom ash portion, the less there is a need for grinding. Thus, because the desired particle size distribution depends on the CaO content of the finer or middle size bottom ash portion, the system advantageously comprises a controller (74) for controlling the grinder on the basis of the measured CaO content of the bottom ash portion. The measurement of the CaO content can be performed by an on-line analyzer, but, in many cases, it is sufficient to frequently analyze the CaO content, or calcium content, of samples taken from the finer or middle size bottom ash portion. The grinder parameters are then adjusted on the basis of the mass flow of the finer or middle size bottom ash portion by taking into account the CaO content of the bottom ash portion.

The ground bottom ash is conveyed from the grinder along a ground ash channel (52) to a hydrator (54), in which the CaO is hydrated, or dry slaked, by a predetermined amount of water or steam (56) to form $Ca(OH)_2$. The hydrator is advantageously a CFB hydrator, but it can alternatively be of any other suitable type. The surface area and moisture content of the produced $Ca(OH)_2$ particles can be varied in a known way by varying the operation parameters in the hydrator. The calcium containing ash particles, especially, particles with a high CaO content, are broken during the hydration to very small particles, because of a volume change associated with the hydration. The hydrated lime is conveyed from the hydrator along a hydrated ash channel (58) to the reactor (28) of the CFB scrubber (22) to be used as a sorbent.

According to a preferred embodiment of the present invention, a stream of fresh CaO (60) is introduced into the hydrator to be dry slaked therein to form sorbent, to be conveyed to the CFB scrubber, in addition to or instead of, sorbent fed with the $Ca(OH)_2$ feed device (24).

Figure 2:
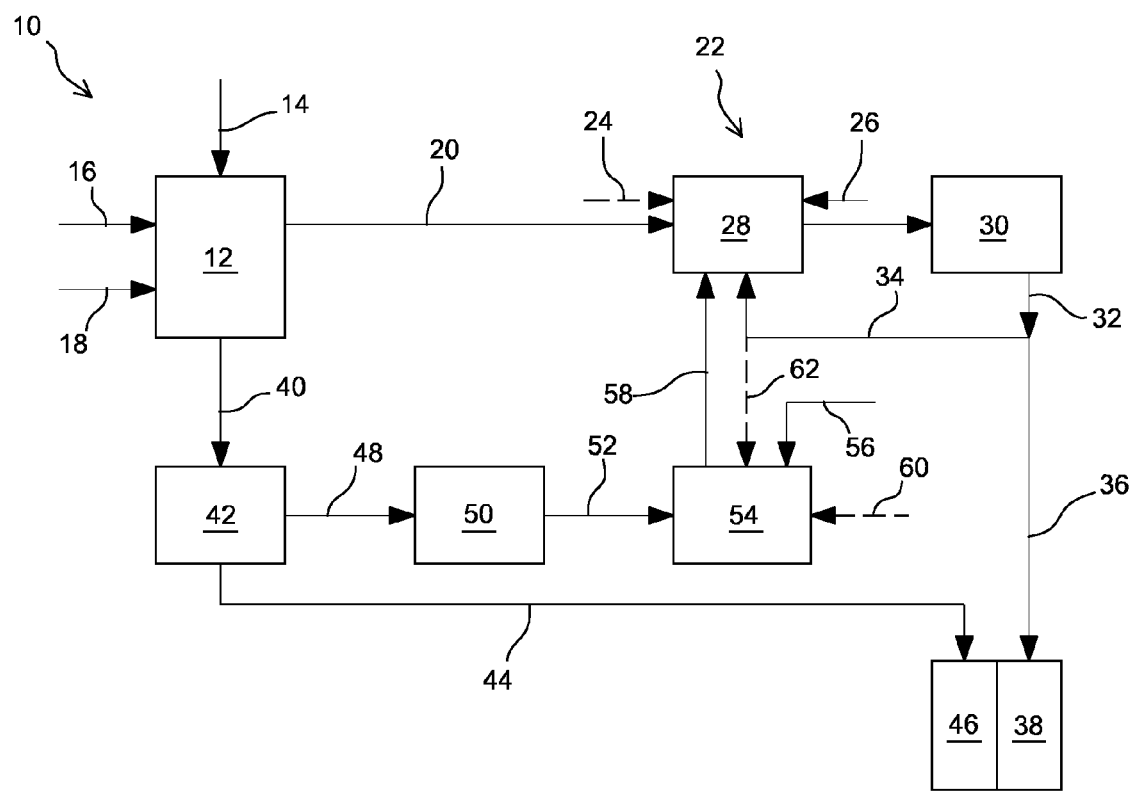
FIG. 2 shows a schematic diagram of a circulating fluidized bed boiler with an apparatus for reducing sulfur oxide emissions according to a second embodiment of the present invention.

The above-described process of desulfurizing exhaust gas may, in some applications, optionally be complemented by further material flows. For example, FIG. 2 shows an embodiment of the present invention, in which a portion of material collected by the dust separator (30) is conveyed along a channel (62) to the hydrator (54). Thereby, CaO particles entrained by the exhaust gas will be activated and converted to $Ca(OH)_2$ by adding water. The activated particles are then conducted along the channel (58) as sorbent to the reactor (28) of the CFB scrubber (22). This feature is especially advantageous when the amount and CaO content of the fly ash entrained with the exhaust gas are high.

Figure 3:
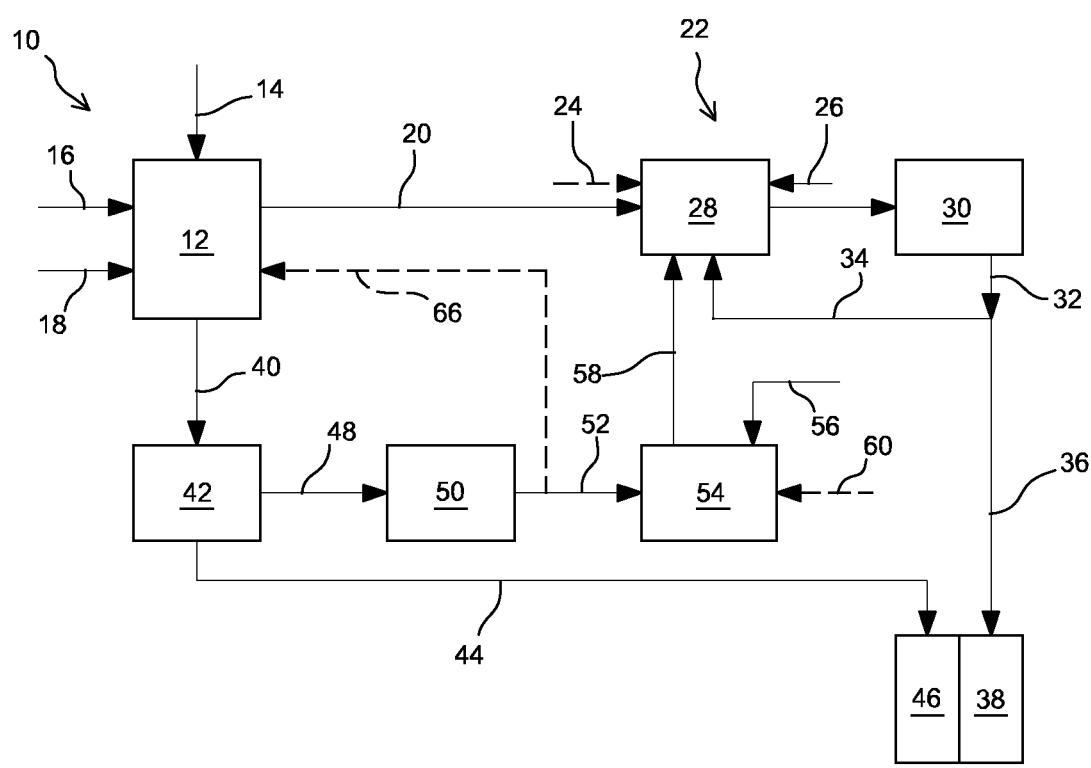
FIG. 3 shows a schematic diagram of a circulating fluidized bed boiler with an apparatus for reducing sulfur oxide emissions according to a third embodiment of the present invention.

FIG. 3 shows an embodiment of the present invention, in which a portion of activated finer or middle size bottom ash portion is conveyed directly from the grinder (50) back to the furnace (12). Because fresh CaO is exposed from behind the $CaSO_4$ layer during the activation in the grinder, the ground bottom ash portion can act as an efficient sorbent in the furnace. This will reduce the need for feeding limestone or $CaCO_3$ into the furnace.

Figure 4:
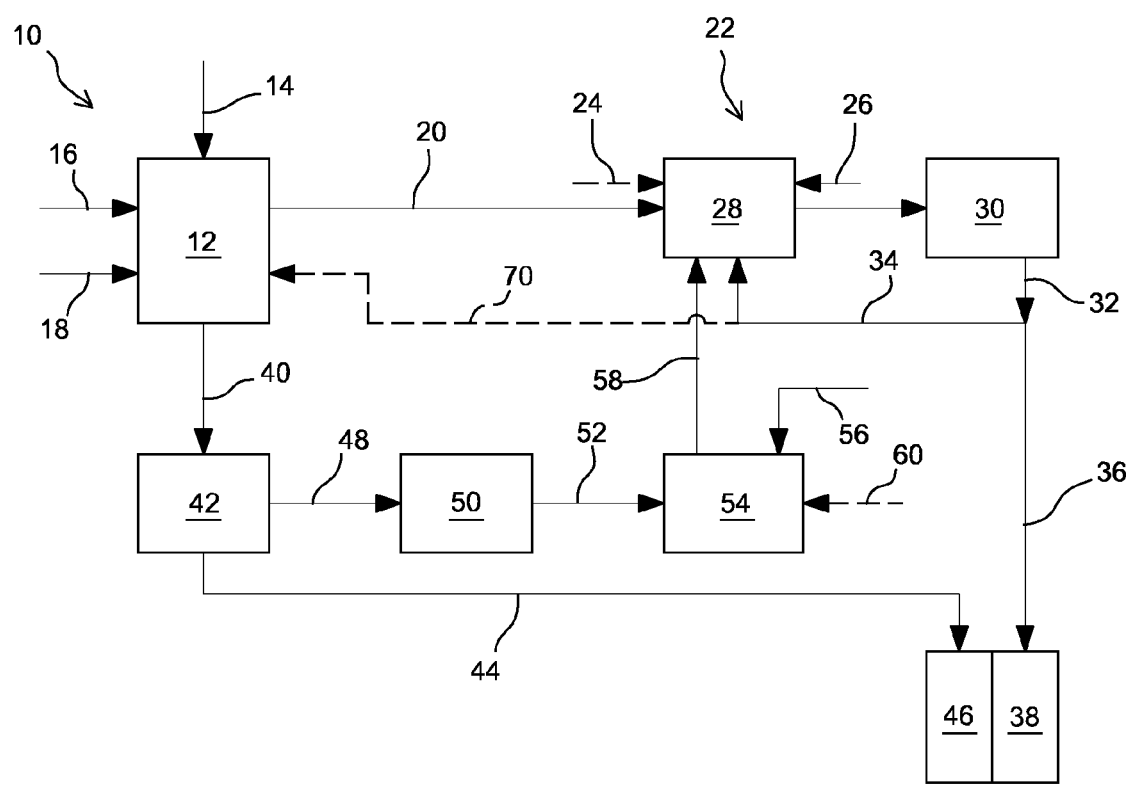
FIG. 4 shows a schematic diagram of a circulating fluidized bed boiler with an apparatus for reducing sulfur oxide emissions according to a fourth embodiment of the present invention.

FIG. 4 shows an embodiment of the present invention, in which a portion of the material collected by the dust separator (30), arranged downstream of the reactor (28), is conveyed along a channel (70) to the furnace (12) of the CFB boiler. This material flow is especially useful for oxidizing $CaSO_3$ in the ash collected by the dust separator (30) to $CaSO_4$, so as to produce a stable combustion product that can be transported to further use without additional treatment.

The main idea of the present invention is to form sorbent to a dry CFB scrubber from the bottom ash of a CFB boiler. This increases the efficiency of the CFB boiler, saves limestone and lime consumption in the process, and provides the ability to obtain useful final products.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims. It is, for example, possible that the streams of ground or hydrated calcium containing ash which are, in FIGS. 1 to 4, shown as direct injection into the reactor of the CFB scrubber or into the furnace or the hydrator, are optionally, non-direct streams via a corresponding silo. It is also possible to use different material flows shown in FIGS. 2 to 4 in a single application, for example, by combining the activation of material from the dust separator (30) as in FIG. 2 with the conveying of activated ash from the grinder (50) to the furnace, as shown in FIG. 3. Also, it is possible to have a second stage classifier (42') shown in FIG. 1 in the embodiments of the FIGS. 2 to 4 as well.

The invention claimed is:

1. A method of combusting sulfurous fuel in a circulating fluidized bed boiler, the method comprising the steps of:
   (a) feeding sulfurous fuel to a furnace of the circulating fluidized bed boiler, combusting the fuel, and generating $SO_2$-containing exhaust gas;
   (b) feeding $CaCO_3$-containing sorbent to the furnace of the boiler for converting the $CaCO_3$ to CaO and utilizing a portion of the CaO in the furnace to convert a portion of the $SO_2$ to $CaSO_4$;
   (c) conveying the $SO_2$-containing exhaust gas along an exhaust gas channel from the furnace (i) to a dry circulating fluidized bed scrubber comprising a reactor having feeds for feeding water and $Ca(OH)_2$ for converting $SO_2$ in the exhaust gas to $CaSO_3$ and $CaSO_4$, and (ii) to a dust separator in gas flow connection with the reactor for separating particulate matter from the exhaust gas;
   (d) removing CaO-containing bottom ash from the furnace;
   (e) classifying, in a first stage classifier, at least a portion of the CaO-containing bottom ash removed from the furnace into a coarse bottom ash portion and a finer bottom ash portion, wherein the coarse bottom ash portion consists of particles having a particle size larger than a first predetermined limit;
   (f) removing the coarse bottom ash portion from the furnace as a first combustion product;
   (g) conveying the finer bottom ash portion from the first stage classifier to a second stage classifier to classify the finer bottom ash portion to a middle size bottom ash portion and a finest size bottom ash portion;
   (h) removing the finest size bottom ash portion as a second combustion product;
   (i) conveying the middle size bottom ash portion to a grinder so as to grind the middle size bottom ash portion to a ground bottom ash portion having a median particle size of a second predetermined limit;
   (j) conveying at least a portion of the ground bottom ash portion from the grinder to a hydrator so as to hydrate CaO in the ground bottom ash portion with a controlled amount of water or steam to produce $Ca(OH)_2$; and
   (k) conveying at least a portion of the $Ca(OH)_2$ from the hydrator to the dry circulating fluidized bed scrubber as a sorbent.

2. A method of combusting sulfurous fuel in a circulating fluidized bed boiler according to claim 1, wherein the second predetermined limit depends on the CaO content of the middle size bottom ash portion conveyed to the grinder.

3. A method of combusting sulfurous fuel in a circulating fluidized bed boiler according to claim 2, wherein the second predetermined limit is lesser the lower is the CaO content of the middle size bottom ash portion conveyed to the grinder.

4. A method of combusting sulfurous fuel in a circulating fluidized bed boiler according to claim 1, wherein the second predetermined limit depends on the CaO content of the middle size bottom ash portion conveyed to the grinder by a formula $0.43*M \pm 3$ μm, in which M is the CaO content in percent.

5. A method of combusting sulfurous fuel in a circulating fluidized bed boiler according to claim 1, further comprising a step of feeding fresh CaO into the hydrator.

6. A method of combusting sulfurous fuel in a circulating fluidized bed boiler according to claim 1, further comprising a step of feeding a portion of the separated particulate matter from the dust separator to the hydrator.

7. A method of combusting sulfurous fuel in a circulating fluidized bed boiler according to claim 1, further comprising a step of conveying a portion of the ground bottom ash portion from the grinder directly to the furnace.

8. A method of combusting sulfurous fuel in a circulating fluidized bed boiler according to claim 1, further comprising a step of feeding a portion of the separated particular matter from the dust separator directly to the furnace.

9. A method of combusting sulfurous fuel in a circulating fluidized bed boiler according to claim 1, further comprising controlling the grinder on the basis of the CaO content of the bottom ash portion conveyed to the grinder.

10. An apparatus for combusting sulfurous fuel in a circulating fluidized bed boiler, the apparatus comprising:
   a feed for feeding sulfurous fuel to a furnace of the circulating fluidized bed boiler for combusting the fuel and generating $SO_2$-containing exhaust gas;
   a feed for feeding $CaCO_3$-containing sorbent to the furnace of the boiler for converting the $CaCO_3$ to CaO and utilizing a portion of the CaO in the furnace to convert a portion of the $SO_2$ to $CaSO_4$;
   an exhaust channel for conveying the $SO_2$-containing exhaust gas from the furnace to a dry circulating fluidized bed scrubber comprising a reactor having feeds for feeding water and $Ca(OH)_2$ for converting $SO_2$ in the exhaust gas to $CaSO_3$ and $CaSO_4$;
   a dust separator in a gas flow connection with the reactor for separating particulate matter from the exhaust gas;
   a discharge for removing CaO-containing bottom ash from the furnace;
   a first stage classifier for classifying at least a portion of the removed CaO-containing bottom ash into a coarse bottom ash portion and a finer bottom ash portion, wherein the coarse bottom ash portion consists of particles having a particle size larger than a first predetermined limit;
   a discharge channel for removing the coarse bottom ash portion from the first stage classifier to a hopper;
   a second stage classifier for classifying the finer bottom ash portion into a middle size bottom ash portion and a finest size bottom ash portion, wherein the finest bottom ash portion consists of particles having a particle size smaller than a second predetermined limit;
   a discharge channel for removing the finest bottom ash portion from the second stage classifier;
   a conveyor for conveying the middle size bottom ash portion to a fine ash channel for conveying the middle size bottom ash portion to a grinder so as to grind the bottom ash portion to a ground bottom ash portion having a median particle size of a third predetermined limit;

a ground ash channel for conveying at least a portion of the ground bottom ash portion from the grinder to a hydrator so as to hydrate CaO in the ground bottom ash portion with a controlled amount of water or steam to produce $Ca(OH)_2$; and a hydrated ash channel for conveying at least a portion of the $Ca(OH)_2$ from the hydrator to the dry circulating fluidized bed scrubber as a sorbent.

11. An apparatus for combusting sulfurous fuel in a circulating fluidized bed boiler according to claim 10, further comprising a controller for controlling the grinder on the basis of the CaO content of the bottom ash portion conveyed to the grinder.

12. An apparatus for combusting sulfurous fuel in a circulating fluidized bed boiler according to claim 11, further comprising a conveyor for conveying a portion of the ground bottom ash portion from the grinder to the furnace.

13. An apparatus for combusting sulfurous fuel in a circulating fluidized bed boiler according to claim 10, wherein the second predetermined limit depends on the CaO content of the middle size bottom ash portion conveyed to the grinder.

14. An apparatus for combusting sulfurous fuel in a circulating fluidized bed boiler according to claim 13, wherein the second predetermined limit is lesser the lower is the CaO content of the middle size bottom ash portion conveyed to the grinder.

15. An apparatus for combusting sulfurous fuel in a circulating fluidized bed boiler according to claim 10, wherein the second predetermined limit depends on the CaO content of the middle size bottom ash portion conveyed to the grinder by a formula $0.43*M \pm 3$ µm, in which M is the CaO content in percent.

16. An apparatus for combusting sulfurous fuel in a circulating fluidized bed boiler according to claim 10, further comprising a feed for feeding fresh CaO into the hydrator.

17. An apparatus for combusting sulfurous fuel in a circulating fluidized bed boiler according to claim 10, further comprising a feed for feeding a portion of the separated particulate matter from the dust separator to the hydrator.

18. An apparatus for combusting sulfurous fuel in a circulating fluidized bed boiler according to claim 10, further comprising a feed for feeding a portion of the separated particular matter from the dust separator directly to the furnace.

* * * * *